(12) United States Patent
Weß et al.

(10) Patent No.: US 11,705,566 B2
(45) Date of Patent: Jul. 18, 2023

(54) FUEL CELL SYSTEM AND METHOD FOR OPERATING A FUEL CELL SYSTEM

(71) Applicants: VOLKSWAGEN AG, Wolfsburg (DE); AUDI AG, Ingolstadt (DE)

(72) Inventors: Alexander Weß, Wolfsburg (DE); Marc Düvel, Cremlingen (DE); Hendrik Schröder, Sickte (DE)

(73) Assignees: VOLKSWAGEN AG, Wolfsburg (DE); AUDI AG, Ingolstadt (DE)

( * ) Notice: Subject to any disclaimer, the term of this patent is extended or adjusted under 35 U.S.C. 154(b) by 1111 days.

(21) Appl. No.: 15/454,929

(22) Filed: Mar. 9, 2017

(65) Prior Publication Data
US 2017/0263956 A1 Sep. 14, 2017

(30) Foreign Application Priority Data
Mar. 9, 2016 (DE) .......................... 102016203866.4

(51) Int. Cl.
*H01M 8/04858* (2016.01)
*H01M 8/04537* (2016.01)
(Continued)

(52) U.S. Cl.
CPC ........... *H01M 8/0494* (2013.01); *B60L 50/72* (2019.02); *H01M 8/04604* (2013.01);
(Continued)

(58) Field of Classification Search
CPC ........... H01M 8/0494; H01M 8/04604; H01M 8/04619; H01M 8/04947; H01M 8/04626;
(Continued)

(56) References Cited

U.S. PATENT DOCUMENTS

| | | | |
|---|---|---|---|
| 7,487,851 B2 | 2/2009 | Buck et al. |
| 7,831,343 B2 | 11/2010 | Formanski et al. |
| 7,939,213 B2 | 5/2011 | Ishikawa et al. |
| 8,952,649 B2 | 2/2015 | Maier |

(Continued)

FOREIGN PATENT DOCUMENTS

| | | |
|---|---|---|
| CN | 103733404 A | 4/2014 |
| DE | 102 33 821 A1 | 2/2004 |

(Continued)

*Primary Examiner* — Cynthia K Walls
(74) *Attorney, Agent, or Firm* — Seed IP Law Group LLP

(57) ABSTRACT

The disclosure relates to a fuel cell system comprising a fuel cell stack for providing an electrical power $P_{stack}$ depending on a power demand, at least one auxiliary unit for operating the fuel cell stack with an electrical power consumption $P_{aux}$, at least one consumer with an electrical power request $P_{use}$, and a control unit for regulating the power demand as well as a method for controlling such a fuel cell system. It is provided that the control unit is configured to selectively operate the fuel cell system in a first operating mode or in a second operating mode, whereby the fuel cell stack is turned off depending on the operating mode upon the falling below of an optimal efficiency degree operating point $P(\eta_{max})$ of the fuel cell system or a minimum operating point $P_{min}$ of the fuel cell stack. In particular, at least one auxiliary unit is also turned off in the first operating mode, when the optimal efficiency degree operating point decreases.

7 Claims, 2 Drawing Sheets

(51) Int. Cl.
*B60L 50/72* (2019.01)
*H01M 16/00* (2006.01)
*H01M 8/10* (2016.01)

(52) U.S. Cl.
CPC ... *H01M 8/04619* (2013.01); *H01M 8/04626* (2013.01); *H01M 8/04947* (2013.01); *H01M 16/006* (2013.01); *H01M 2008/1095* (2013.01); *H01M 2250/20* (2013.01); *Y02T 90/40* (2013.01)

(58) Field of Classification Search
CPC ....... H01M 16/006; H01M 2008/1095; H01M 2250/20; H01M 8/04; H01M 8/04298; B60L 50/72; Y02T 90/32
See application file for complete search history.

(56) References Cited

U.S. PATENT DOCUMENTS

| | | | |
|---|---|---|---|
| 9,257,707 | B2 | 2/2016 | Milacic et al. |
| 2010/0009219 | A1* | 1/2010 | Kwon ............... H01M 8/04679 429/432 |
| 2011/0087389 | A1 | 4/2011 | Burleigh et al. |
| 2013/0065147 | A1 | 3/2013 | Autenrieth |
| 2014/0203636 | A1 | 7/2014 | Goetz et al. |

FOREIGN PATENT DOCUMENTS

| | | |
|---|---|---|
| DE | 10 2005 059 838 A1 | 4/2007 |
| DE | 10 2007 051 819 A1 | 7/2008 |
| DE | 10 2010 047 527 A1 | 5/2011 |
| DE | 10 2010 018 907 A1 | 11/2011 |
| DE | 10 2013 104 324 A1 | 12/2013 |
| DE | 10 2014 204 230 A1 | 9/2014 |
| DE | 11 2004 001 186 B4 | 9/2015 |

\* cited by examiner

FUEL CELL SYSTEM AND METHOD FOR OPERATING A FUEL CELL SYSTEM

BACKGROUND

Technical Field

The disclosure relates to a fuel cell system and a method for operating a fuel cell system. The disclosure further relates to a vehicle with such a fuel cell system.

Description of the Related Art

Fuel cells utilize the chemical conversion of a fuel, with oxygen to water, in order to generate electrical energy. For this purpose, fuel cells contain the so-called membrane electrode assembly (MEA) as a core component, which is an arrangement of an ion-conducting (often proton-conducting) membrane and of a catalytic electrode (anode and cathode), respectively arranged on both sides of the membrane. Generally, the fuel cell is constituted by a plurality of MEAs arranged in the stack, whose electrical power outputs accumulates. Between the individual membrane electrode assemblies, bipolar plates (also called flow field plates or separator plates) are usually arranged, which ensure a supply of the individual cells with the operating media, i.e., the reactants, and are usually also used for cooling. In addition, the bipolar plates also ensure an electrically conductive contact to the membrane electrode assemblies.

Fuel cell systems can be operated in a start/stop mode, in which switching between a normal operating mode, in which the fuel cell is operated to generate electrical current, and a standby mode takes place. The standby mode is generally set, if a power demand from the fuel cell does not exists. This is the event in the case of an electric vehicle, for example, when the vehicle temporarily stops (for example, at a traffic light), rolls to a stop, or rolls downhill. In standby mode, the operating medium delivery to the fuel cell is partially or completely stopped and the voltage of the fuel cell stack is typically maintained at a voltage below 0.85 volt per individual cell, in particular, at a voltage below 0.4 volt per individual cell, especially, in order to prevent damage to the fuel cell stack.

In order to operate a fuel cell stack, a plurality of auxiliary units is required. Depending on the fuel cell system, the plurality of auxiliary units can be comprised of at least one air compressor, a recirculation fan, a cooling water pump, valves, sensors, etc. The power consumption of these components can be called a parasitic power consumption $P_{aux}$, since it must indeed be provided by the fuel cell stack but is not available to external consumers. The net power available to external consumers of the fuel cell system $P_{net}$ thus, results as the difference of the electrical power produced by the stack $P_{stack}$ and the parasitic power consumption $P_{aux}$. Since the power, available to external consumers (such as the electric drive), is reduced by the parasitic power in accordance with $P_{net}=P_{stack}-P_{aux}$, the net power of the fuel cell system $P_{net}$ is always below the power of the fuel cell stack $P_{stack}$.

The degree of efficiency $\eta$ of the fuel cell system describes the ratio of system power to stack power and depends on all conversion losses in the system chain. Thus, the useful power of the fuel cell system results as $P_{system}=\eta*P_{stack}$. Depending on the operating state of the fuel cell system or a fuel cell vehicle, the system chain can comprise different levels, such as the fuel cell stack, an energy converter, transfer losses and storage losses in the battery, the electric drive, and/or auxiliary units and consumers. Particularly at low load, for example as a result of a low current draw in standby mode, the available useful power decreases in proportion to the stack power and the efficiency of the fuel cell system, thus, decreases disproportionately as a result of the operated auxiliary units. In addition, the following applies to the system efficiency $\eta=P_{system}/P_{stack}$ and with $P_{system} \leq P_{net}=P_{stack}-P_{aux}$, thus in particular, $\eta \leq 1-P_{aux}/P_{stack}$. This also results in a decreasing efficiency with decreasing stack power, for example when reaching a low load range, which can be defined by $P_{stack}<10*P_{aux}$, $P_{stack}<5*P_{aux}$, or $P_{stack}<2*P_{aux}$.

Load-dependent methods for switching a fuel cell system into a standby mode are already known from the prior state of the art.

US 2014/0272657 A1 discloses a method for switching a fuel cell stack into a standby mode as soon as a power request falls below a certain limit value. In standby mode, the fuel cell stack is turned off and a compressor in the cathode supply continues to be operated at a minimum speed. In doing so, the idling of the compressor should enable a quick restart of the system but reduces at the same time the efficiency optimization achievable in standby mode.

In addition, in the method for turning off a fuel cell system according to U.S. Pat. No. 8,952,649 B2, a fuel cell stack is turned off, when a minimum power request falls below. A compressor arranged in the cathode supply is first placed into a dynamic standby mode and continues to be operated in the idle state, until the energy required for idling $E_{idle}$ exceeds an energy necessary to start up the compressor $E_{up}$. Only then, the compressor is also placed into a static standby mode and turned off completely.

Entrance criteria on the vehicle level and on the level of the fuel cell system are taken into consideration in the method for turning off a fuel cell system, according to US 2011/0087389 A1. In doing so, the entrance criteria on the vehicle level include a position of a switch lever, a load request, and the charge state of a battery, for example. The entrance criteria on the system level include an operating duration and a temperature of the fuel cell stack, for example. Thus, a turning off of the fuel cell stack in the standby mode is to be avoided, if its restart would be energetically unfavorable.

In the methods known from the prior state of the art for turning off fuel cell systems, an attempt is always made to find a compromise between an optimized degree of efficiency and an optimized dynamic of the fuel cell system. However, in particular in the arrangement of a fuel cell system in a vehicle, such complex control methods often result in undesired effects and a reduced dynamic overall and a reduced degree of efficiency overall.

BRIEF SUMMARY

The disclosure is now based on the task of proposing a fuel cell system and a method for operating a fuel cell system, wherein both an optimal efficiency and an optimal dynamic of the fuel cell system can be realized. In addition, the operating method should be easily applicable to existing fuel cell systems and is to allow for a high degree of interaction.

This task is solved by a fuel cell system, by a vehicle with such a fuel cell system, and by a method for operating a fuel cell system.

The task according to the disclosure is solved by a fuel cell system comprising a fuel cell stack for providing an electrical power $P_{stack}$ depending on a power demand, at least one auxiliary unit of the fuel cell stack with an electrical power consumption $P_{aux}$, at least one consumer with an electrical power request $P_{use}$, and a control unit for regulating the power demand. The control unit of the fuel cell system, according to the disclosure, is configured to operate the fuel cell system selectively in a first operating mode or in a second operating mode and to turn off the fuel cell stack in the first operating mode as soon as an optimal efficiency operating point $P(\eta_{max})$ of the fuel cell system decreases, and to turn off the fuel cell stack in the second operating mode as soon as a minimum operating point $P_{min}$ of the fuel cell stack decreases.

According to the disclosure, the fuel cell system can, thus, be operated selectively in a first, optimal efficiency operating mode or in a second, optimal power operating mode. At the optimal efficiency operating point $P(\eta_{max})$ of the fuel cell system, a higher current draw from the fuel cell stack takes place than at the minimum operating point $P_{min}$ of the fuel cell stack. The fuel cell stack is, thus, turned off at a higher current draw in the first operating mode than in the second operating mode. A minimum load, where the fuel cell stack is turned off upon its decrease, is, thus, higher in the first operating mode than in the second operating mode.

As described above, a fuel cell system has a particularly poor efficiency $\eta$ in a low load range. If the current draw from a fuel cell stack decreases, the fuel cell system comes increasingly into the low load range. According to the disclosure, the fuel cell stack is turned off significantly earlier in the first operating mode than in the second operating mode, when the current draw from the stack decreases. In the first operating mode, an increased degree of efficiency is, thus, achieved over the operating time of the fuel cell stack than in the second operating mode. In the second operating mode, an improved dynamic of the fuel cell system is achieved, since the fuel cell stack continues to be available over a broader operating range. In particular, the fuel cell stack must not first be started up in a time-consuming manner in the second operating mode, when the power demand increases to above the low load range. By selectively operating the fuel cell system in the first operating mode or the second operating mode, the respective advantage associated with the operating mode is achieved to a particularly high degree.

In a preferred embodiment, the control unit is configured to automatically operate the fuel cell system, in one of the first and the second operating mode. The control unit, prefers in particular, to make the selection of the operating mode at a certain point in time dependent on the course of the power requests in a certain time period before this point in time. For example, if significant fluctuations of the power requests occurred in this time period, i.e., if a high dynamic of the fuel cell system was requested in the past, the control unit preferably operates the fuel cell system in the second operating mode. However, if a predominantly constant power request occurred in this time period, the control unit preferably operates the fuel cell system in the first operating mode.

The optimal efficiency operating point $P(\eta_{max})$ of the fuel cell system in this document refers to an operating point, at which the maximum possible system efficiency $\eta$ of the fuel cell system is, at least approximately, achieved. Strictly speaking, it is also an operating point of the fuel cell stack, which is; however, determined depending on the entire fuel cell system, in particular $P(\eta_{max})=P_{\eta max}*\eta_{max}$. As described above, the system efficiency is low, for example, if the available useful power $P_{system}$ is low as a result of the operation of a high power consumption $P_{aux}$ of auxiliary units in relation to the stack power $P_{stack}$. In addition, conversion losses of auxiliary units arranged in the fuel cell system and of consumers connected to the fuel cell system are included in the system efficiency. In particular, storage losses of an energy storage unit connected to the fuel cell system or the efficiency of an electric motor connected to the fuel cell system affect the system efficiency. The storage losses depend on the charge state of the energy storage unit and the efficiency of the electric motor depends on its operating state, which is why the optimal efficiency operating point $P(\eta_{max})$ fluctuates during operation of the fuel cell system.

The minimum operating point $P_{min}$ of the fuel cell stack defines an operating point of the fuel cell stack, below which a power output of a fuel cell stack may not fall, in particular in order to prevent processes detrimental to the service life in the fuel cell stack. Generally, the minimum operating point $P_{min}$ of the fuel cell stack corresponds to a lower power output or a lower drawn current than the optimal efficiency operating point $P(\eta_{max})$ of the fuel cell system. In the first operating mode, the low load range, which can be defined as the range between the minimum operating point $P_{min}$ of the fuel cell stack and the optimal efficiency operating point $P(\eta_{max})$ of the fuel cell system, is thus an inaccessible range for the fuel cell stack. In the second operating mode, only the range below the minimum operating point $P_{min}$ of the fuel cell stack is inaccessible to the fuel cell stack.

In a preferred embodiment of the fuel cell system, according to the disclosure, the control unit is further configured to turn off at least one auxiliary unit in the first operating mode as soon as the optimal efficiency degree operating point $P(\eta_{max})$ of the fuel cell system decreases. According to this embodiment, energy is, thus, additionally saved by turning off the auxiliary units of the fuel cell stack in the range of poor efficiency degrees of the fuel cell system. The auxiliary units are, thus, not operated by alternative energy sources, in the first operating mode and below the optimal efficiency operating point $P(\eta_{max})$ of the fuel cell system in particular, not by an energy storage unit or a traction motor in generator mode. The efficiency of the fuel cell system in the first operating mode is, thus, increased further; dynamic losses as a result of the necessary restart of the auxiliary units are taken into consideration.

In an also preferred embodiment of the fuel cell system, according to the disclosure, the control unit is further configured to determine an electrical power requested by at least one consumer $P_{use}$ and to increase the electrical power requested by at least one consumer, if the determined power request $P_{use}$ is lower than the net power provided by the fuel cell system $P_{stack}-P_{aux}$. In other words, the control unit is configured to increase the electrical power requested by at least one consumer, if at any point in time, the sum of the electrical power consumed by at least one auxiliary unit $P_{aux}$ and the electrical power requested by at least one consumer $P_{use}$ is lower than the power provided by the fuel cell stack $P_{stack}$, in particular, in the first operating mode. The control unit, in particular, is preferably, configured to first increase the electrical power $P_{use}$, requested by a consumer, when it falls below the optimal degree of efficiency of the operating point $P(\eta_{max})$ of the fuel cell system.

In this preferred embodiment, the power demand from the fuel cell stack is, thus, increased by increasing the power request of at least one consumer, whereby the optimal efficiency operating point $P\eta_{max}$ of the fuel cell system is once again set or exceeded. Only if the control unit determines that an increase in the power requested by at least one consumer $P_{use}$ and, thus, an increase in the power demand from the fuel cell stack is not possible, the control unit turns off the fuel cell stack. Further, the control unit also turns off the fuel cell stack, if an increase of the power requested by at least one consumer $P_{use}$ is possible, but the increase itself is associated with a degradation of the system efficiency degree q, which overcompensates for the efficiency degree improvement by leaving the low load range. The control unit is, thus, preferably configured, when it falls below the optimal efficiency degree operating point $P(\eta_{max})$ of the fuel cell system, to prioritize increasing the electrical power requested by at least one consumer $P_{use}$, against the turning off, of the fuel cell stack. In other words, the control unit is configured to overwrite other control processes in order to first increase the power demand from the fuel cell stack.

Advantageously, this preferred embodiment enables that the power demand from the fuel cell stack or the power provided by the fuel cell stack $P_{stack}$ does not have to be decreased when the power requested by at least one consumer $P_{use}$ decreases. Instead, the reaction to a decrease, caused by the operating state of the vehicle, of the power requested by at least one consumer $P_{use}$ is to specifically increase the power request of at least one consumer. This can take place in different ways depending on the application of the fuel cell system, such as by reducing the energy supply to the fuel cell system from other energy sources or by increasing the energy intake of an energy storage unit. Alternatively, the power requested by at least one consumer can be increased by connecting additional consumers to the fuel cell system or by increasing additional functionalities of consumers already connected to the fuel cell system. For example, the power request by consumers, such as electric heaters, air-conditioning units, and compressors can be specifically increased for a short period of time. According to this embodiment, the low load range of the fuel cell stack, low degrees of efficiency of the fuel cell system, and a turning off of the fuel cell stack are, thus, avoided.

In a particularly preferred embodiment of the fuel cell system, according to the disclosure, at least one consumer comprises an energy storage unit and the control unit is further configured to turn off the fuel cell stack in a first operating mode, if the determined power request $P_{use}$ is lower than the net power provided by the fuel cell stack $P_{stack}-P_{aux}$ and if a charge state of the energy storage unit exceeds a certain limit value. The control unit is, thus, configured according to this embodiment to determine a charge state of an energy storage unit, in particular its capacity for storing additional electrical power. If it is determined in the process that the charge state exceeds a certain limit value, i.e., the capacity for storing additional electrical power is low, the control unit turns off the fuel cell stack and preferably at least one auxiliary unit, if the power requested by at least one consumer $P_{use}$ is lower than the net power of the fuel cell system. In other words, the control unit checks, upon the decrease of the optimal efficiency operating point $P(\eta_{max})$ of the fuel cell system, whether the charge state of the energy storage unit allows for an increase in the power request $P_{use}$. If this is the case, i.e., if the charge state of the energy storage unit is below the certain limit value, the control unit first increases the power request $P_{use}$, as described above. Only if the control unit determines that the optimal efficiency operating point $P(\eta_{max})$ of the fuel cell system has decreased and an increase in the power requested $P_{use}$ is not possible as a result of the charge state of the energy storage unit or results in a degradation of the system efficiency q, which overcompensates for the efficiency improvement by leaving the low load range, the control unit turns off the fuel cell system.

In an also preferred embodiment of the fuel cell system, according to the disclosure, the control unit is further configured to, at least, require a minimum power demand from the fuel cell stack in the first operating mode. This means that during the entire duration of the first operating mode, a minimum or a higher power demand is required from the fuel cell stack. In this case, the minimum power demand causes the fuel cell stack to provide an electrical power $P_{stack}$, which exceeds the electrical power consumed by at least one auxiliary unit $P_{aux}$. The minimum power demand also causes the fuel cell system to operate, at least approximately, at the optimal efficiency operating point or above the optimal efficiency operating point $P\eta_{max}$ of the fuel cell system. Advantageously, the control unit of this embodiment ensures using only one control variable, namely the minimum power demand, for the operation of the fuel cell system in the first operating mode. In doing so, the minimum power demand can be determined from a characteristic diagram using the determined values of $P_{aux}$ and $P_{use}$. Alternatively, the minimum power demand is a preset value.

In an also preferred embodiment of the fuel cell system, according to the disclosure, the control unit is furthermore configured to determine the decrease of the optimal efficiency operating point $P(\eta_{max})$ of the fuel cell system, if the sum of the electrical power consumed by at least one auxiliary unit $P_{aux}$ and the electrical power requested by at least one consumer $P_{use}$ is lower than the power provided by the fuel cell stack as a result of the minimum power demand $P^{min}_{stack}$. According to this embodiment, the control unit determines the electrical power requested by at least one consumer $P_{use}$ and the electrical power consumed by at least one auxiliary unit $P_{aux}$. The sum of these electrical powers is compared, by the control unit, to the power provided by the fuel cell stack as a result of the minimum power demand $P^{min}_{stack}$. If $P^{min}_{stack}$ is lower than the expected summed consumption power $P_{use}+P_{aux}$, the control unit ascertains the falling below of the optimal efficiency operating point $P(\eta_{max})$ of the fuel cell system and, turns, off the fuel cell stack, in a preferred embodiment, also its auxiliary units.

In an also preferred embodiment of the fuel cell system, according to the disclosure, the control unit is further configured to determine the achievement of the minimum operating point $P_{min}$ of the fuel cell stack, if a certain limit voltage $U_{max}$ of the fuel cell stack is reached. During the operation of the fuel cell stack, it is required to avoid high cell voltages, since these voltages can lead to a degradation of the catalytic material of the cathodes and anodes of the cells. Advantageously, the control unit is configured, according to this embodiment to determine the cell voltages of the fuel cell stack and to determine therefrom, whether a limit voltage $U_{max}$ of the fuel cell stack is reached. Advantageously, the control unit can, thus, fall back on a fixed comparative value; upon achieving it in the second operating mode, the fuel cell stack is to be turned off and the decrease of $P_{min}$ can; thus, be reliably prevented.

In an also preferred embodiment of the fuel cell system, it is also first attempted in the second operating mode upon reaching the limit voltage $U_{max}$ to increase a power request of at least one consumer $P_{use}$ in order to exceed the minimum operating point $P_{min}$ of the fuel cell stack and to initially avoid turning off the fuel cell stack. For prioritizing the increase of a power request from the fuel cell stack, the above mentioned statements apply, regarding the first operating mode, with the difference that in the second operating mode, an increasing of the power request $P_{use}$ also takes place, if a degradation of the system efficiency η is associated with it, which overcompensates for the efficiency improvement by leaving the low load range.

The object of the disclosure is also a vehicle with a fuel cell system as described above.

In a preferred embodiment of the vehicle, according to the disclosure, the control unit is further configured to operate the fuel cell system depending on a manual input of a driver or based on a driver type detection, either in the first operating mode or in the second operating mode. This enables the driver to influence the operating mode of the fuel cell system directly. In particular, the driver is or can be enabled to select between the first, optimal consumption operating mode (ECO mode) and the second, optimal power operating mode (SPORT mode). This selection can take place, for example, by adjusting a selector lever position. The driver can, thus, choose, whether he prefers reaching a maximum range with the available fuel or a dynamic manner of driving. The selection of the operating modes also preferably take place based on a driver type detection, for example, by detecting a specific radio key or by analyzing the driving behavior during driving. For example, by detecting a certain speed range, a driving environment, such as city traffic or highway, can be deduced and the appropriate operating mode can be selected. Alternatively, a direct detection of the driving environment can take place, for example, by external sensors of the vehicle. An automatic selection of an operating mode, also preferably, takes place additionally based on past power demands (for example, different accelerator pedal gradients) as described above. Between the first and the second operating mode are, also preferably provided, additional operating modes, which can constitute an intermediate level between the first and the second operating mode and can correspond to a driver's wish.

The object of the disclosure is also a method for operating a fuel cell system, which comprises a fuel cell stack for providing an electrical power $P_{stack}$ depending on a power demand, at least one auxiliary unit of the fuel cell stack with an electrical power consumption $P_{aux}$, at least one consumer with an electrical power request $P_{use}$, and a control unit for regulating the power demand. The method, according to the disclosure, comprises the method steps: Selectively operating the fuel cell system in a first operating mode or in a second operating mode, turns off the fuel cell stack in a first operating mode as soon as an optimal efficiency operating point $P(\eta_{max})$ of the fuel cell system decreases, and turns off the fuel cell stack in a second operating mode as soon as a minimum operating mode $P_{min}$ of the fuel cell stack decreases.

In a preferred embodiment of the method, according to the disclosure, a turning off of at least one auxiliary unit further takes place in the first operating mode as soon as the optimal efficiency operating point $P(\eta_{max})$ of the fuel cell system decreases.

In a preferred embodiment of the method, according to the disclosure, a configuration of a minimum power demand is further, at least, required in the first operating mode from the fuel cell stack for operating the fuel cell system (at least approximately) at the optimal efficiency degree operating point or above the optimal efficiency operating point $P(\eta_{max})$ and for the provision of an electrical power $P_{stack}$ by the fuel cell stack, which exceeds the electrical power consumed by at least one auxiliary unit $P_{aux}$.

In a preferred embodiment of the method, according to the disclosure, the optimal efficiency operating point $P(\eta_{max})$ of the fuel cell system decreases, if the sum of an electrical power consumed by at least one auxiliary unit $P_{aux}$ and an electrical power requested by at least one consumer $P_{use}$ is lower than the power provided by the fuel cell stack as a result of the minimum power demand $P^{min}_{stack}$.

In a preferred embodiment of the method, according to the disclosure, a determination of an electrical power requested by at least one consumer $P_{use}$ and an increase of the electrical power requested by at least one consumer further takes place, if the determined power request $P_{use}$ is lower than the net power provided by the fuel cell system $P_{stack}-P_{aux}$. Turning off the fuel cell stack only takes place, if the optimal efficiency operating point $P(\eta_{max})$ of the fuel cell system decreases and an increase of the electrical power requested by at least one consumer $P_{use}$ is not possible or results in a degradation of the system efficiency q, which overcompensates for the efficiency improvement by leaving the low load range.

In a preferred embodiment of the method, according to the disclosure, at least one consumer comprises an energy storage unit and a turning off of the fuel cell stack further takes place, in a first operating mode, if the determined power request $P_{use}$ is lower than the net power provided by the fuel cell system $P_{stack}-P_{aux}$ and if a charge state of the energy storage unit exceeds a certain limit value.

In a preferred embodiment of the method, according to the disclosure, the minimum operating point $P_{min}$ of the fuel cell stack is reached, if a certain limit voltage $U_{max}$ of the fuel cell stack is reached. In an also preferred embodiment of the method, the fuel cell system is arranged in a vehicle and a switching between the first operating mode and the second operating mode takes place as a result of a manual input by a driver or based on a driver detection type. The object of the disclosure is also a fuel cell system, with a control unit, which is configured to be implemented according to the disclosure method.

Additional preferred embodiments of the disclosure arise from the other features mentioned in the sub claims.

The different embodiments of the disclosure mentioned in this application can be advantageously combined with one another unless otherwise stated in individual cases.

BRIEF DESCRIPTION OF THE SEVERAL VIEWS OF THE DRAWINGS

The disclosure is explained below in exemplary embodiments with reference to the associated drawings. The figures show.

DETAILED DESCRIPTION

Figure 1:
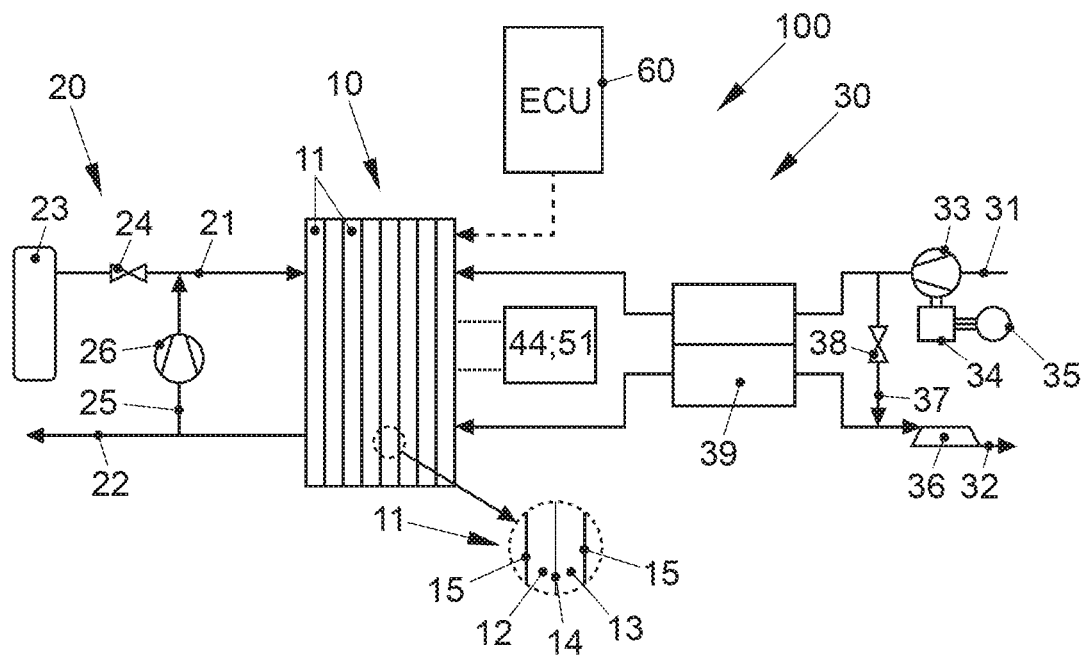
FIG. 1 is a schematic representation of a fuel cell system according to an embodiment.

FIG. 1 shows a fuel cell system, denoted with 100 overall, according to a preferred embodiment of the present disclosure. The fuel cell system 100 is part of a vehicle not shown in further detail, in particular of an electric vehicle, which comprises an electric traction motor, which is supplied with electrical energy by the respective fuel cell system 100.

The fuel cell system 100 comprises as core components a fuel cell stack 10, which comprises a plurality of individual cells 11, which are arranged in the form of a stack and which are formed by alternately stacked membrane electrode assemblies (MEAs) 14 and bipolar plates 15 (see detailed view). Each individual cell 11 thus respectively comprises an MEA 14 with an ion-conductive polymer electrolyte membrane not shown in more detail here and catalytic electrodes arranged thereon on both sides. These electrodes catalyze the respective partial reaction of the fuel conversion. The anode and cathode electrodes are designed as coating on the membrane and comprise a catalytic material, such as platinum, which is provided on an electrically conductive substrate material, with a large specific surface, such as a carbon-based material.

As shown in the detailed view of FIG. 1, an anode chamber 12 is formed between a bipolar plate 15 and the anode and the cathode chamber 13 is formed between the cathode and the next bipolar plate 15. The bipolar plates 15 serve to supply the operating media in the anode and cathode chambers 12, 13 and further establishes the electrical connection between the individual fuel cells 11. Optionally, gas diffusion layers can be arranged between the membrane electrode assemblies 14 and the bipolar plates 15.

To supply the fuel cell stack 10 with the operating media, the 100 fuel cell systems comprise an anode supply 20, on the one hand and a cathode supply 30 on the other hand.

The anode supply 20 of the 100 fuel cell system, shown in FIG. 1, comprises an anode supply path 21, which serves to supply an anode operating medium (the fuel), such as hydrogen, to the anode chambers 12 of the fuel cell stack 10. For this purpose, the anode supply paths 21 connects a fuel storage tank 23 to an anode inlet of the fuel cell stack 10. The anode supply 20 further comprises an anode exhaust gas path 22, which discharges the anode exhaust gas from the anode chambers 12 via an anode outlet of the fuel cell stack 10. The anode operating pressure on the anode sides 12 of the fuel cell stack 10 can be adjusted via an initial agent 24 in the anode supply path 21.

In addition, the anode supply 20 of the fuel cell system shown in FIG. 1 comprises a recirculation line 25, which connects the anode exhaust gas path 22 to the anode supply path 21. The recirculation of fuel is usual, in order to return the fuel, which is in most cases used overstoichiometrically, to the fuel cell stack 10. In the recirculation line 25 a recirculation conveyor 26 is arranged, preferably a recirculation fan.

The cathode supply 30 of the fuel cell system 100, shown in FIG. 1, comprises a cathode supply path 31, which supplies an oxygen-containing cathode operating medium, in particular, air taken in from the environment, to the cathode chambers 13 of the fuel cells stack 10. The cathode supply 30 further comprises a cathode exhaust gas path 32, which discharges the cathode exhaust gas (in particular the exhaust air) from the cathode chambers 13 of the fuel cell stack 10 and if necessary supplies it to an exhaust gas system, not shown. For conveying and compacting the cathode operating medium, a compressor 33 is arranged in the cathode supply path 31. In the exemplary embodiment shown, the compressor 33 is designed as a compressor 33, which is mainly driven by an electric motor 34 equipped with appropriate power electronics 35. The compressor 33 can further be auxiliary driven by a turbine 36 (if necessary with variable turbine geometry) arranged in the cathode exhaust gas path 32 via a common shaft, (not shown).

The fuel cell system 100, shown in FIG. 1 further comprises a humidifier module 39. The humidifier module 39 is arranged in the cathode supply path 31, on the one hand, so that the cathode operating gas can flow through it. On the other hand, the arrangement in the cathode exhaust gas path 32 allows the cathode exhaust gas can flow through it. A humidifier 39 typically comprises a plurality of water vapor permeable membranes, which are designed to be either flat or in the form of hollow fibers. Thereby, the comparatively dry cathode operating gas (air) flows over one side of the membranes and the comparatively moist cathode exhaust gas (exhaust gas) flows over the other side. Driven by the higher partial pressure of the water vapor in the cathode exhaust gas, water vapors pass over the membrane into the cathode operating gas, which is moistened in this way. The cathode supply 30 further comprises a bypass line 37, which connects the cathode supply line 31 to the cathode exhaust gas line 32. An agent 38 arranged in the bypass line 37 serves to control the amount of the cathode operating medium surrounding the fuel cell stack 10.

Different additional details of the anode and cathode supply 20, 30 are not shown in the simplified FIG. 1, for reasons of clarity. For example, a water separator can be installed in the anode and/or cathode exhaust gas path 22, 32 in order to condense and drain product water arising from the fuel cell reaction. Finally, the anode exhaust gas line 22 can merge into the cathode exhaust gas line 32 so that the anode exhaust gas and the cathode exhaust gas are discharged via a common exhaust gas system.

The fuel cell system 100 further comprises a control unit 60, which requires a power demand from the fuel cell stack 10, and at least one consumer 44, 51 with the electrical power request $P_{use}$. A detailed description of the function of the control unit 60 in connection with at least one consumer 44, 51 is given in the description of FIG. 2.

Figure 2:
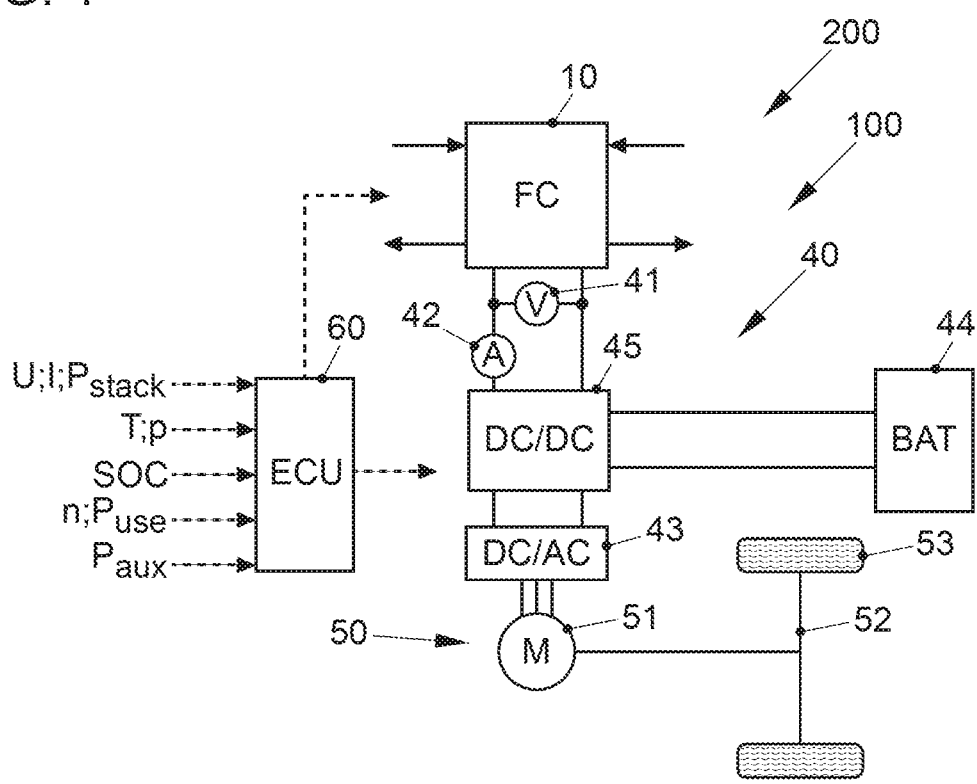
FIG. 2 is a schematic representation of a vehicle according to an embodiment.

FIG. 2 shows a vehicle, which is denoted with 200 overall and which comprises the fuel cell system 100, from FIG. 1, the electronic control unit 60 contained therein, an electrical power system 40, and a vehicle drive system 50. At least one consumer 44, 51 of the fuel cell system is in this case constituted by components of the vehicle.

The electrical power system 40 comprises a voltage sensor 41 for detecting a voltage generated by the fuel cell stack 10, and a current sensor 42 for detecting a current generated by the fuel cell stack 10. The electrical power system 40 further comprises an energy storage unit 44, such as a high-voltage battery or a capacitor. In the power system 40 a converter 45 is further arranged, designed in triport topology (triport converter). The battery 44 is connected to the first side of the double DC/DC converter 45. All traction network components of the drive system 50 are connected to a second side of the converter 45, with a fixed voltage level. In the same or a similar manner, the auxiliary units of the fuel cell system itself, such as the electric motor 34 of the compressor 33 (see FIG. 1), or other electrical consumers of the vehicle, such as a compressor for an air-conditioning unit or the like, can be connected to the power network.

The drive system 50 comprises an electric motor 51, which serves as traction motor of the vehicle 200. To this end, the electric motor 51 drives a drive axle 52 with drive wheels 53 arranged thereon. The traction motor 51 is connected via an inverter 43 to the electronic power system 40 of the fuel cell system 100 and constitutes the main electrical consumer of the system.

The electronic control unit 60 controls the operation of the fuel cell system 100, in particular its anode and cathode supply 20, 30, its electrical power system 40 and the traction motor 51. For this purpose, the control unit 60 receives different input signals, such as the voltage U, detected using the voltage sensor 41, of the fuel cell 10, the current I, detected using the current sensor 42, of the fuel cell stack 10, the power $P_{stack}$, resulting from the voltage U and the current I, of the fuel cell 10, information about the temperature T of the fuel cell stack 10, the p pressures in the anode and/or cathode chamber 12, 13, the charge state SOC of the energy storage unit 44, the n rotational speed of the traction motor 51, and other input variables. Alternatively, some of the aforementioned values, such as $P_{stack}$, can also be determined in the control unit 60 itself. Further, the electrical power $P_{use}$ requested by the electrical consumers of the vehicle 200, in particular by the traction motor 51 and/or the energy storage unit 44 and the electrical power consumed by the auxiliary units of the fuel cell stack 10 $P_{aux}$ are received by the control unit 60. The requested electrical power $P_{use}$ can contain, as components, a traction power requested by the driver of the vehicle 200 $P_W$ and the power requested by an air-conditioning system. The variable $P_W$ is, in particular, detected via a pedal sensor from the force used to operate an accelerator pedal not shown here. The control unit 60, shown in FIG. 2, can also be provided in a vehicle 200 as a distributed control system, for example comprising a control subunit for the fuel cell system and an additional control subunit for the drive.

Depending on the input variables, in particular from the power requested by the consumers $P_{use}$ and the power required for the auxiliary units $P_{aux}$, the control unit 60 determines a power to be demanded from the fuel cell system $P_{system}$ and a power demand to be required, thus, from the fuel cell stack 10. From this, the control unit 60 determines the required mass currents or operating pressures of the anode and cathode operating medium, from calculations or appropriately stored characteristic diagrams and controls the operating medium supply of the fuel cell system, for example, via the electric motor 34 of the compressor 33, as well as the agents 24, 38, etc. of the fuel cell system 100. Further, the control unit 60 controls the inverter 43 in order to supply energy to the traction motor 51 as well as the converter 45 and possibly other converters in order to charge or discharge the energy storage unit 44 and to supply energy to the consumers connected to the power network.

Figure 3:
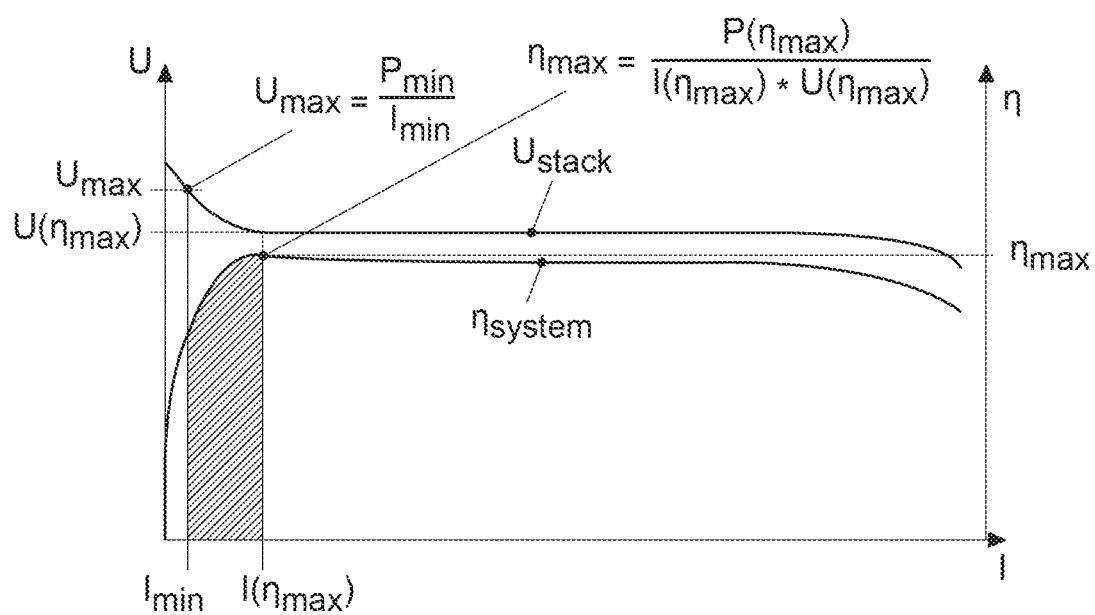
FIG. 3 is current-voltage characteristic curve of a fuel cell stack ($U_{stack}$) and efficiency degree curve of a fuel cell system ($\eta_{system}$)

FIG. 3 shows an efficiency curve $\eta_{system}$ of a fuel cell system (100) according to the disclosure and a current-voltage characteristic curve $U_{stack}$ of the fuel cell stack (10) arranged therein.

It is obvious from FIG. 3 that at a low load, i.e., in a low load range, of the fuel cell system, i.e., at a low current draw from the fuel cell system, a low power output of the fuel cell system or a low efficiency of the overall system is caused by a comparatively high consumption of the auxiliary units. An operating point A of the fuel cell stack is unambiguously determined by a point of the current-voltage characteristic curve $U_{stack}$ via $P_A=U_A*I_A$. An operating point B of the fuel cell system is unambiguously determined by a point of the efficiency curve $\eta_B$ and by the voltage and current of the fuel cell stack at that point by $P(\eta_B)=\eta_B*U_B*I_B$. In FIG. 3 an upper limit voltage $U_{max}$ is further drawn in, whose exceeding of can lead to damage to the fuel cell as a result of a degradation of the catalytic material and, thus, to cell aging. This upper limit voltage is reached by the fuel cell stack at its minimum operating point $P_{min}$, at which the fuel cell stack outputs a current $I_{min}=P_{min}/U_{max}$. Further, an optimal efficiency operating point of the fuel cell system $P(\eta_{max})=\eta_{max}*I(\eta_{max})*U(\eta_{max})$ is drawn in, which corresponds to a local maximum $\eta_{max}$ of the efficiency degree of the fuel cell system.

According to the disclosure, the fuel cell stack is turned off in a first operating mode of the fuel cell system, when the optimal efficiency operating point $P(\eta_{max})$ decreases so that the shaded area (low load range) is not available to the fuel cell system and the fuel cell stack, in the first operating mode. In a second operating mode of the fuel cell system, according to the disclosure, the fuel cell system is not turned off, until the minimum operating point $P_{min}$ decreases, to prevent the maximum cell voltage $U_{max}$ from being exceeded. Upon reaching the minimum operating point or the limit voltage $U_{max}$, the fuel cell stack is either completely turned off or alternatively placed into a standby mode. In the standby mode, the auxiliary units of the fuel cell stack continue to operate so that the fuel cell stack can be quickly started up again from the standby mode.

Preferably, the transition into the standby mode takes place by interrupting the air supply into the cathode chambers upon reaching the minimum operating point and by the oxygen present in the cathode chambers reacting with the fuel (hydrogen), which continues to be supplied. In the meantime, an additional electrical power discharge from the stack takes place, until the chemical reaction stops. In doing so, the discharge process is controlled via a voltage-dependent discharge current. As a result of the oxygen under supply, the discharge current is reduced when the voltage is constant.

Based on the efficiency curve, shown in FIG. 3, and the displayed current-voltage characteristic curve, different operating states of a vehicle 200 with a fuel cell system 100, an energy storage unit 44, and an electric traction motor 51 will now be explained. Thus, in particular, it is addressed how the operating states differ depending on whether the fuel cell system is operated in the first operating mode or in the second operating mode. The control unit 60 is configured to perform these operating states in the first operating mode and in the second operating mode. The vehicle 200 has the operating states fuel cell operation, boost operation, battery operation, and recuperation operation, without being limited to them.

In fuel cell operation, the traction motor 51 is used to drive the vehicle 200 and the required power is provided solely by the fuel cell stack 100. In the first operating mode, the fuel cell stack 100 is operated above the optimal efficiency operating point $P(\eta_{max})$. As long as the power request $P_{use}$ by the traction motor 51 makes possible an operation of the fuel cell system 10, above the optimal efficiency operating point $P(\eta_{max})$, and as a result of this power demand, an electrical power $P_{stack}$ is, in particular provided by the fuel cell stack 100, whose electrical power exceeds an electrical power consumed by at least one auxiliary unit $P_{aux}$, the energy storage unit 44 is passive and neither outputs nor stores power. As soon as the power request by the traction motor 51 and, thus, the power demand from the fuel cell stack decreases to the extent that the latter is operated below the optimal efficiency operating point $P(\eta_{max})$, the charge state of the energy storage unit 44 is queried and, if it does not exceed a certain limit value, the energy storage unit 44 is charged in addition to the operation of the traction motor 51 and the power request $P_{use}$ is thereby increased. Only after the charge state of the energy storage unit 44 exceeds a certain limit value and the efficiency gain is, thus, overcompensated for as a result of the increased power request $P_{use}$ by an efficiency loss in the energy storage unit (transfer losses and storage losses), the fuel cell stack 100 is turned off and the traction motor 51 is supplied only by the energy storage unit 44. In the second operating mode, the fuel cell stack 100 is operated permanently above the minimum operating point $P_{(min)}$.

In boost operation, the traction motor 51 is used to drive the vehicle 200, wherein the required electrical power is jointly provided by the fuel cell stack 100 and the energy storage unit 44. The boost operation in the first operating mode does not significantly differ from the boost operation in the second operating mode.

In battery operation, the traction motor 51 is used to drive the vehicle 200 and the required power is provided solely by the energy storage unit 44. In the first operating mode, the fuel cell stack 100 and, preferably, also its auxiliary units 24, 26, 33, 34, 38 are deactivated. In the second operating mode, the fuel cell stack 100 and its auxiliary units 24, 26, 33, 34, 38 can also be deactivated but can, in addition, also be present in an activated or a passive state. In battery operation in the second operating mode and with activated fuel cell stack, the energy storage unit 44 is also responsible for providing the drive power. However, the fuel cell stack 100 is activated and permanently provides the minimum power demand $P_{min}$. With this power, additional consumers, such as an air-conditioning system, can, for example, be supplied or the energy storage unit 44 can be charged. In addition, a quick switching into boost operation and into fuel cell operation and, thus, a very high driving dynamic is possible. In battery operation in the second operating mode and with passive fuel cell stack 100, the energy storage unit 44 is also responsible for providing the drive power. The energy storage unit further supplies the auxiliary units 24, 26, 33, 34, 38 of the fuel cell stack 100 with energy, while the fuel cell stack 100 is deactivated. This operating state also allows for a quick switching into battery operation, with activated fuel cell or into boost operation and thus a high driving dynamic.

In recuperation operation, the traction motor 51 is used to charge the energy storage unit 44. In this case, in the first operating mode, the fuel cell stack 100 and preferably also its auxiliary units 24, 26, 33, 34, 38 are deactivated, if a power demand by other consumers of the vehicle 200, such as an air-conditioning system (not shown), does not allow for an operation of the fuel cell system 10 above the optimal efficiency degree operating point $P(\eta_{max})$. In addition to the traction motor 51 working as a generator, a charge control of the energy storage unit 44 can possibly also request power from the fuel cell stack 100 and, thus, allow for operating the fuel cell system 10 above the optimal efficiency operating point $P(\eta_{max})$. In the second operating mode, the fuel cell stack 100 and its auxiliary units 24, 26, 33, 34, 38 can also be deactivated but can in addition also be present in an activated or a passive state. The active and the passive state of the fuel cell stack 100 in recuperation operation are in this case equal to these states in battery operation.

The invention claimed is:

1. A fuel cell system, comprising:
   a fuel cell stack for providing an electrical power $P_{stack}$ depending on a power demand;
   at least one auxiliary unit for operating the fuel cell stack with electrical power consumption $P_{aux}$;
   at least one consumer with electrical power request $P_{use}$; and
   a control unit for regulating the power demand,
   wherein the control unit is programmed to:
   operate the fuel cell system selectively in a high efficiency operating mode and in a high power range operating mode;
   increase the power request from the at least one consumer in the high efficiency operating mode responsive to the power demand falling below a first threshold power demand corresponding to an optimal efficiency degree operating point $P(\eta_{max})$ of the fuel cell system, and
   increase the power request from the at least one consumer in the high power range operating mode responsive to the power demand falling below a second threshold power demand corresponding to a minimum operating point $P_{min}$ of the fuel cell stack, wherein the first threshold power demand is higher than the second threshold power demand.

2. The fuel cell system according to claim 1 wherein the control unit is further programmed to turn off at least one auxiliary unit in the high efficiency operating mode when the power demand falls below the first threshold power demand.

3. The fuel cell system according to claim 1 wherein the control unit is further programmed to determine, in the first operating mode, an electrical power requested by at least one consumer $P_{use}$; and to increase the electrical power requested by at least one consumer, if the determined power request $P_{use}$ is lower than the net power provided by the fuel cell system $P_{stack}-P_{aux}$.

4. The fuel cell system according to claim 1 wherein the control unit is further programmed to require at least a minimum power demand from the fuel cell stack in the first operating mode so that the electrical power provided by the fuel cell stack $P_{stack}$ exceeds the electrical power consumed by at least one auxiliary unit $P_{aux}$; and the fuel cell system is operated above the optimal efficiency operating point $P(\eta_{max})$.

5. A vehicle with a fuel cell system according to claim 1 wherein it indicates at least one consumer of a traction motor.

6. The vehicle according to claim 5 wherein the control unit is further programmed to operate the fuel cell system depending on a manual input of a driver or based on a driver type detection either in the high efficiency operating mode or in the high power range operating mode.

7. A method for operating a fuel cell system, the fuel cell system including:
   a fuel cell stack for providing an electrical power $P_{stack}$ depending on a power demand; at least one auxiliary unit for operating the fuel cell stack with an electrical power consumption $P_{aux}$;
   at least one consumer with an electrical power request $P_{use}$; and
   a control unit for regulating the power demand;
   wherein the method comprises:
   selectively operating the fuel cell system in a high efficiency operating mode or in a high power range operating mode;
   increasing the power request from the at least one consumer in the high efficiency operating mode responsive to the power demand falling below a first threshold power demand corresponding to an optimal efficiency degree operating point $P(\eta_{max})$ of the fuel cell system, and
   increasing the power request from the at least one consumer in the high power range operating mode responsive to the power demand falling below a second threshold power demand corresponding to a minimum operating point $P_{min}$ of the fuel cell stack, wherein the first threshold power demand is higher than the second threshold power demand.

* * * * *